US006638984B2

(12) United States Patent
Soane et al.

(10) Patent No.: US 6,638,984 B2
(45) Date of Patent: Oct. 28, 2003

(54) MICROCELLULAR FOAMS, THEIR METHOD OF PRODUCTION, AND USES AND PRODUCTS THEREOF

(75) Inventors: David S. Soane, Piedmont, CA (US); Michael R. Houston, Berkeley, CA (US)

(73) Assignee: Nano-Tex, LLC, Emeryville, CA (US)

( * ) Notice: Subject to any disclaimer, the term of this patent is extended or adjusted under 35 U.S.C. 154(b) by 0 days.

(21) Appl. No.: 10/235,418

(22) Filed: Sep. 5, 2002

(65) Prior Publication Data

US 2003/0008932 A1 Jan. 9, 2003

Related U.S. Application Data

(63) Continuation of application No. 09/877,992, filed on Jun. 8, 2001, which is a continuation of application No. PCT/US99/29358, filed on Dec. 10, 1999.
(60) Provisional application No. 60/111,777, filed on Dec. 10, 1998, and provisional application No. 60/111,778, filed on Dec. 10, 1998.

(51) Int. Cl.$^7$ ............................... C08J 9/32; B01J 13/02
(52) U.S. Cl. ............................. 521/56; 521/59; 521/60; 521/149; 521/134
(58) Field of Search ..................... 521/56, 60, 149, 521/134

(56) References Cited

U.S. PATENT DOCUMENTS

| | | | |
|---|---|---|---|
| 3,615,972 A | 10/1971 | Morehouse et al. | 156/79 |
| 3,960,583 A | 6/1976 | Netting et al. | 106/122 |
| 5,045,569 A | * 9/1991 | Delgado | |
| 5,053,436 A | * 10/1991 | Delgado | |
| 5,055,240 A | 10/1991 | Lee et al. | 264/5 |
| 6,221,486 B1 | 4/2001 | Soane et al. | 428/364 |

FOREIGN PATENT DOCUMENTS

WO  WO 00/37547  7/2000

OTHER PUBLICATIONS

Database WPI, Section Ch, Wk 199713, Derwent Publns (London), XP002145096 & JP 09 019634 A (Matsumoto Yushi Seiyaku KK), Jan. 21 1997—abstract.
PCT International Search Report for PCT/US99/29358 (ZMSI–005P), Aug. 28, 2000.

* cited by examiner

Primary Examiner—Morton Foelak
(74) Attorney, Agent, or Firm—Jacqueline S. Larson

(57) ABSTRACT

The present invention is directed to thermo-expandable microspheres and to the expanded microballoons, microcellular foam or foamed composite material that results upon heating the microspheres. The thermo-expandable microsphere of the present invention is characterized by having a polymeric wall surrounding one or more pockets or particles of blowing agent or propellant within the microsphere. The polymeric wall may have reactive functional groups on its surface to give a fusible microsphere. When the microspheres are heated, they expand to form microballoons comprising polymeric shells surrounding one or more internal gaseous voids, and when the microspheres are expanded while in contact with each other, a microcellular foam may be formed. The foam consists of a plurality of microballoons fused together, optionally aided by functional groups present on the surface of the heated microspheres that act to crosslink the material. When microspheres are mixed with a matrix, which can optionally react with functional groups on the microsphere surface, and the resulting combination is heated, the microspheres expand to give a foamed composite material in which the microballoons may be fused or chemically crosslinked to the matrix.

14 Claims, No Drawings

MICROCELLULAR FOAMS, THEIR METHOD OF PRODUCTION, AND USES AND PRODUCTS THEREOF

This application is a continuation application of application Ser. No. 09/877,992, filed Jun. 8, 2001, which is a continuation of International Application No. PCT/US99/29358, filed on Dec. 10, 1999 and designating the United States of America, which International Application claims the benefit of Provisional application Serial No. 60/111,777, filed Dec. 10, 1998, and also claims benefit of Provisional application Serial No. 60/111,778, filed Dec. 10, 1998. The disclosures of all applications are incorporated herein by reference in their entireties.

FIELD OF THE INVENTION

This invention relates to the field of plastic particles, more specifically to the field of expandable and optionally fusible plastic microspheres, and hollow plastic microballoons, microcellular foam or foamed composite materials produced therefrom.

BACKGROUND OF THE INVENTION

Hollow microballoons or microbubbles find prevalent use throughout industry, most commonly as additives or fillers. The primary benefit of hollow microspheres over more conventional fillers (e.g., silicates, aluminates, clays, talcs, etc.) is weight reduction. Hollow microspheres offer a means of introducing controlled, small voids in a closed-cell configuration. This can be difficult to obtain in both viscous and non-viscous fluids, resins, coatings, and cements using conventional foaming agents due to problems associated with the foaming process such as unequal cell growth, time- and temperature-dependent gas diffusion, cell coalescence, etc. Thus, hollow microspheres provide a means for uniformly and homogeneously increasing product bulk while simultaneously decreasing the overall density, lowering product cost on a volumetric basis without sacrificing (or while enhancing) performance.

In addition to the benefits of weight reduction and cheaper product cost, hollow microspheres offer many other advantages in a wide variety of products. For example, fluid products such as printing inks and paints benefit from the spherical shape of hollow microspheres, resulting in viscosity reduction, enhanced flow and leveling, faster dispersion time, smoother surface finish, and an overall increased volume load capacity. Higher loading capacities in turn lead to increased hiding power, maximum tint strength, better gloss control, VOC reduction, dimensional stability, improved applicability, and further overall weight or density reduction.

A wide range of products, such as thermoplastic resins, epoxies, sealants, pipe insulation, potting compounds, spackling compounds, underbody coatings, papers, fabrics, dielectric laminates, prosthetic devices, synthetic foams, cultured marble, polymer concretes, and synthetic cements also benefit from hollow microsphere additives. The primary improvement is again weight reduction, but additional improvements may include: increased volume load capacity; reduced product warpage, shrinkage, and/or cracking; abrasion resistance or abradability; corrosion resistance; increased impact strength; smoother surface finishes; improved molding of intricate parts; disruption of directional orientation (in polymer systems); decreased dielectric constant and/or increased capacitance; increased bulk and stiffness in paper and paperboard; improved sensitivities in explosives (greater thermal insulation and shock resistance); easier machinability; water resistance; better sound absorption; and increased compressibility.

Production methods and compositions for hollow microspheres made from various glass, metallic, or polymeric materials have been disclosed, patented, or used in the past, e.g. see U.S. Pat. Nos. 3,615,972, 3,838,998, 3,888,957, 3,933,955, 3,945,956, 4,133,854, 4,257,798, 4,303,603, 4,349,456, 4,661,137, 4,767,726, 4,782,097, 4,983,550, 5,069,702, and 5,053,436. The particles or microspheres, hollow or otherwise, and/or their method of fabrication as referenced above or in the literature have one or more disadvantages or limitations that have hindered their commercialization or restricted their field of use.

For example, many hollow microspheres are composed of glass or ceramic oxide shell walls, exhibiting a true particle density in the range of 0.1 to 0.4 g/cc. Microspheres such as these must often be washed in a series of treatment baths to reduce alkali content. The microspheres must further be dried from said bath, an operation that is energy inefficient and which leads to clumping unless special drying agents are used. Due to their poor impact strength, glass microspheres are subject to rupture under conditions of high shear, which may be experienced during such common operations as pumping, injection molding, extruding, calendering, or milling. Ruptured microspheres no longer possess the benefit of low density, and the nonspherical shape of the resulting fragments negates many of the other beneficial properties to be realized from the incorporation of spherically shaped additives.

To compensate for the fragility of certain glass compositions, thick-walled glass or ceramic microspheres have been proposed, e.g. see U.S. Pat. No. 3,838,998 (thick-walled glass), U.S. Pat. No. 4,349,456 (ceramic), U.S. Pat. No. 4,983,550 (strong glass), U.S. Pat. No. 5,077,241 (ceramic bubbles), and U.S. Pat. No. 5,225,123 (sintered particle-walls). Thick-walled microspheres exhibit a significantly higher density, however, since their internal void volume is greatly sacrificed to increase structural integrity. As a result, thick-walled microspheres exhibit a particle density of 0.3 to 0.7 g/cc, diminishing the overall effect of density reduction, and are more costly due to increased material usage. Ceramic microspheres tend to have thicker shell walls as well, exhibiting densities up to 0.7 g/cc, and their production requires significantly more expensive precursor materials. Thus, glass or ceramic microspheres possess many disadvantages that inhibit their full commercial exploitation.

To overcome some of the limitations inherent in the production and properties of glass or ceramic microspheres, plastic microspheres have been developed, e.g. see U.S. Pat. Nos. 3,615,972, 3,945,956, 4,049,604, 4,075,134, 4,303,603, and 5,053,436. These hollow microspheres are typically composed of a thermoplastic shell wall material that sometimes encapsulates a solid or liquid core. For instance, Famand and Puddington (U.S. Pat. No. 3,975,194) disclose a process for hollow microsphere production that utilizes a solid core material which sublimes at room temperature by rapid diffusion through the shell wall, leaving behind a liquid shell which is then dried. More commonly, the materials of construction are chosen such that the polymeric shell walls soften upon heating, and a volatile liquid core expands the shell wall by vaporizing to form a hollow, nominally spherical particle. For example, see U.S. Pat. Nos. 3,821,128, 4,108,806, and 5,536,756. Because thermoplastic polymers are incorporated into such particles, the microsphere shell walls are significantly more fracture-resistant than glass, and are therefore less prone to rupture and breakage during high shear operations.

Liquid-filled thermoplastic microcapsules have another advantage over glass or ceramic microspheres in that the expansion of the liquid-filled plastic microcapsules can be triggered after formulation in the end-use product. Glass and ceramic microspheres soften only at extremely high temperatures, making their expansion process incompatible with most end-use products. Liquid-filled, expandable plastic microcapsules on the other hand can be incorporated into products such as resins, coatings, cements, paints or inks in an unexpanded state. These products may then be mixed, pumped, extruded, or otherwise handled and applied in a manner consistent with their use, followed by a heating step which inflates the microcapsules into their hollow, thin-walled, low-density configuration. The expansion caused by the inflating microspheres aides in molding, shaping, or texturing the end-use product. Furthermore, since mixing, extrusion, and molding operations occur while the plastic microcapsules are in an unexpanded (and therefore less fragile) state, the likelihood of rupturing or breaking the particles is greatly diminished. Since the thermoplastic microsphere materials typically have good fracture strength properties and the microballoons are not subjected to high-shear operations after expansion, the microspheres may also be expanded to a greater extent than glass or ceramic microspheres, leading to thin-walled thermoplastic balloons with densities as low as 0.01 g/cc, much lower than hollow glass or ceramic microspheres.

Thermoplastic microspheres in the present art are manufactured by an emulsion polymerization process in which a polymerizable monomer and an inert, hydrophobic liquid (blowing agent) are mixed together, then are emulsified in an immiscible aqueous phase to form very small droplets of monomer/blowing agent. Initiators are then used to trigger polymerization within the droplets among the monomeric precursors. The polymer forms at or migrates to the droplet surface, creating a shell wall that becomes thicker as polymerization proceeds. The blowing agent is chosen to be insoluble in both the polymer and aqueous phase, so it remains inside the droplet, surrounded by the polymeric shell. See, for example, U.S. Pat. No. 3,615,972. Unfortunately, the thermoplastic, liquid-filled expandable microspheres and/or their method of fabrication have one or more disadvantages or limitations that have hindered their commercialization or restricted their field of use.

One such problem with the current technology for the production of expandable microspheres is that emulsion polymerization is a difficult process to control from a manufacturing standpoint. Particle sizes, shell-wall thicknesses, blowing agent content, and ultimately the overall expansion amount, all vary with only slight changes in the formulation of the overall emulsion mixture. Such formulations must be tightly controlled with respect to the concentration of monomers, crosslinkers, blowing agents, polymerization catalysts, surfactants and colloids (used to control droplet size and dispersion), colloid promoters, thickening agents, and free-radical scavengers such as oxygen (oxygen generally must be excluded by flushing the system with an inert gas). Temperature, pressure, and the degree of agitation must also be closely monitored to produce a homogeneous and consistent product. Furthermore, removal of the surfactants used to create the emulsion requires additional washing steps, and complete reaction and/or removal of the unreacted monomer is difficult. The tight process control necessary to carry out an industrial-scale process of this type, as well as the waste streams produced by such a process, make emulsion polymerization a less-than-ideal manufacturing method for the production of liquid-filled expandable microspheres.

It should also be noted that once polymerization is complete and the particles are collected from the aqueous phase, they are still in a wet cake state and must further be dried to form a free-flowing, dispersible powder. The spheres are temperature-sensitive (depending on the softening point of the polymeric shell walls), so high-temperature evaporative drying often may not be used to remove the moisture in a timely manner. Also, since the aqueous slurry contains many contaminants and additives from the emulsion polymerization process, the particles tend to agglomerate and clump during the final drying step. For these reasons, the current art of microsphere production often uses chemical drying agents such as sodium, calcium, or magnesium chlorides or hydroxides, in addition to moderate temperature evaporative drying, to dry the particles and keep them from clumping. See, e.g., U.S. Pat. Nos. 4,722,943, 4,829,094, 5,180,752, or 5,342,689. These agents typically leave a residue on the surface of the particles that cannot be easily removed prior to their incorporation into an end-use product. This residue can also render the microsphere surfaces inert and unable to bond to or react with the surrounding matrix in the end-use products. It is therefore less than desirable that such drying agents are used in the current art to dry microspheres from the aqueous phase in which they are polymerized. A more advantageous approach would be one that requires no drying from a mother liquor, or at least a drying process which does not require chemical drying agents which may later contaminate end-use products.

The specialized polymerization techniques that make up the current art of microcapsule production also limit microcapsule compositions to polymers amenable to emulsion or suspension free-radical polymerizations. That is, the polymer composition is limited to those monomers that are not miscible with water and that polymerize by free-radical addition mechanisms. Unfortunately, many modern engineering thermoplastics can not be polymerized by free-radical addition polymerization techniques. Polymers formed by anionic "living" polymerization techniques, and by poly-condensation reactions, for example, are not amenable to free-radical, emulsion polymerizations. As a result, polymers which might be advantageously chosen for use as microsphere shell-wall materials, such as certain engineering thermoplastics, may not be incorporated into microballoons using the current art.

In addition, incorporating reactive entities or sites within the microsphere shell wall is problematic since a reactive environment is necessary to initiate the polymerization of the monomeric precursors. Reactive entities contemplated for incorporation into the microcapsules must not only be restricted to ones that are inert towards the reactive intermediates taking part in the polymerization reaction, but the reactive entities must also be compatible with the monomeric precursors and polymeric shell walls thereby formed, and must also not be appreciably extracted into the surrounding aqueous phase. Thus, the emulsion or suspension polymerization processes used in the current art to form expandable microspheres inherently limit the types of additives, reactive or otherwise, that can be incorporated into the final product.

Another limitation of the current art is that only liquid-filled, expandable microcapsules are available using the current production techniques. In certain situations, liquid propellants may be desirable since they exert a sufficient vapor pressure to expand the polymeric shell walls, yet recondense into a liquid state after the expanded microballoons have hardened and cooled. In other situations, however, liquid propellants may not be desirable. The main drawback to liquid propellants is their finite permeability in the polymer shell wall. This permeability, combined with the inherent volatility of the liquid blowing agent, leads to evaporation of the propellant when it reaches the surface of the microcapsule. Thus, the loss of propellant through the polymer shell wall changes the microcapsule composition over time, which can ultimately change or degrade the microcapsule performance as it ages.

The current expandable microsphere technology typically uses volatile hydrocarbon blowing agents, which, unfortunately, produce very flammable vapors. Since the liquid blowing agent typically accounts for about 10 to 50 weight percent of the expandable microcapsules, it can present a significant fire hazard both during storage and upon expansion. This hazard is especially acute if propellant vapors are allowed to migrate and accumulate inside a closed container. This problem is exacerbated by the tendency of many dust-like materials to accumulate static charge, since such charge build up can provide an ignition source for the accumulated flammable vapors. While the use of halogenated propellants may mitigate the flammability problem, the use of these materials has been greatly curtailed in recent years mostly due to environmentally concerns. Thus, there are certain situations where a non-flammable propellant that also does not leak or diffuse out of the micropsheres would be useful in the production, storage, and/or use of expandable microspheres.

SUMMARY OF THE INVENTION

The present invention is directed to thermo-expandable, thermoplastic or thermosettable microspheres, their method of production, and the hollow, nominally spherical microballoons and/or microcellular foam that result upon heating said thermo-expandable microspheres. The thermo-expandable microspheres of the present invention are characterized by having a polymeric shell surrounding one or more pockets or particles of liquid or solid blowing agent or propellant within the microsphere. The microspheres are free-flowing; that is, they do not agglomerate and are detached from each other. Because they do not agglomerate, the microspheres do not require the use of drying agents that remain with the microspheres after drying, leaving a surface coating or residue. The microspheres of the present invention are drying agent- or residue-free. In one embodiment of the present invention, the microspheres are also fusible or crosslinkable with each other and/or a surrounding matrix.

The terms "thermo-expandable microsphere" or "expandable microsphere" or "expandable microcapsule", as used herein and in the appended claims, mean a particle which is capable of increasing in size upon heating due to the formation of one or more gaseous voids or bubbles in the interior of the particle to give a microbubble or microballoon. The terms "microbubble" or "microballoon", as used herein and in the appended claims, mean a hollow particle defined by having a polymeric shell wall surrounding one or more internal, gaseous voids. The term "fusible", as used herein and in the appended claims, means able to fuse together into a connected foamed or foamable mass.

The present invention discloses a unique approach that overcomes the drawbacks of commercially established processes for the production of expandable plastic microspheres. It is unique in that it uses only physical processes and solution thermodynamics to create expandable microspheres. Polymerization is not an intrinsic step in the microsphere formation process of this invention. The process is also unique in that any pre-polymerized material having a suitable solvent may be used to form the microsphere shell walls, irrespective of the polymerization technique used to synthesize the polymer. By selecting functional polymers that have reactive sites within the polymer chain, and/or by incorporating crosslinking agents into the polymer shells, expandable microspheres may be readily produced which are fusible or crosslinkable with adjacent microspheres or with a matrix material in which the microspheres have been incorporated. For these reasons and others that will become clear, the present invention is an extremely economical process suitable for mass production.

In one embodiment of the process of the invention, a polymer, co-polymer, or polymer blend is solvated by an appropriate solvent, and combined with an inert liquid, which serves as a blowing agent or propellant. Optionally, crosslinkers, catalysts, plasticizers, stabilizers, pigments, and other desirable additives may be added to the mixture. The mixture is then atomized into air, or homogenized in a second immiscible liquid, to produce microscopic droplets. Either by evaporation or liquid-liquid extraction, the solvent is then removed from the droplets, precipitating the polymer from solution and effectively solidifying the droplets into hard-walled polymeric microspheres containing liquid blowing agent cores and other optional additives.

In another embodiment of the process of the invention, a polymer, co-polymer, or polymer blend is solvated by an appropriate solvent, and is combined with a solid that produces a gas upon heating. Optionally, crosslinkers, catalysts, plasticizers, stabilizers, pigments, and other desirable additives may be added to the mixture. The mixture is then atomized into air, or homogenized in a second immiscible liquid, to produce microscopic droplets. Either by evaporation or liquid-liquid extraction, the solvent is then removed from the droplets, precipitating the polymer and additives from solution and effectively solidifying the droplets into hard-walled polymeric microspheres surrounding blowing agent cores that are solid at room temperature.

Utilizing either method, the final product is a powder consisting of flowable, dispersible, residue-free, thermoplastic or thermosetting expandable microspheres. The polymer, co-polymer, or polymer blend may be chosen from any existing polymers, provided there exists a suitable solvent capable of dissolving said polymer. The microspheres preferably possess reactive functionalities, either built into the polymer chains or added to the formulation in the form of crosslinking or other reactive groups, that allow the microspheres to fuse to each other or to a surrounding matrix upon expansion into hollow microballoons.

Thus, this invention makes possible a broad selection of microsphere compositions. It may be used to obtain microspheres made from conventional thermoplastics, thermosets, elastomers, naturally occurring polymers, engineering thermoplastics, or mixtures of these or other polymers. The polymer and propellant may further be chosen to give a wide range of blowing temperatures at which the polymer softens and the microspheres expand to produce microballoons, which may optionally be fused to each other or to a surrounding matrix. The invention further provides a means to manufacture said microspheres without the need for emulsification or suspension polymerization techniques, emulsification agents or additives, or chemical drying agents for drying the particles from the mother liquor.

These and other benefits of the invention will be made apparent in the detailed description of the invention that follows.

DETAILED DESCRIPTION OF THE INVENTION

The present invention is directed to the production of expandable microspheres capable of expanding into microballoons, which optionally may fuse with adjacent microballoons or the surrounding matrix, upon the application of heat. These expandable, optionally fusible microspheres are synthesized by using purely physical processes. The present invention is unique in that it uses commercially available, pre-polymerized materials in a physical process governed solely by solution thermodynamics for the economical manufacture of expandable and fusible microspheres.

A. Formulation

I. With Liquid Blowing Agents

Polymeric microspheres containing liquid blowing agents are produced by first forming a solution consisting of the polymer that is to form the microballoon shell walls and a suitable solvent. The wall-forming polymer may be a thermoplastic, a thermoset, an elastomer, or a mixture of polymers, optionally mixed with cross-linkers (i.e., thermosettable precursors), plasticizers, or other desirable additives. A "suitable solvent" is a solvent capable of dissolving the polymer to form a polymer solution that is homogeneous on a macroscopic scale and is free-flowing. The polymer may be solvated to a concentration between about 0.5 and 90 wt %. More preferably, the polymer is solvated at as high a concentration as possible where solution atomization or break-up into microdroplets is still achievable, such as by atomization or suspension and agitation in a second immiscible liquid. This generally leads to solutions with a polymer content between about 10 and 50 wt %.

In accordance with the present invention, an inert liquid blowing agent (or propellant) is also added to the solvated polymer solution. By "inert" it is meant that the blowing agent does not chemically react with either the polymer solvent or the polymer during the normal course of microsphere formation and processing. The blowing agent is selected such that it is miscible with the polymer solvent, but incompatible with the pure polymer, i.e., it does not act as a solvent for the polymer. The blowing agent is also typically selected such that it disperses in the polymer-solvent solution with no phase separation up to its desired concentration. The blowing agent is further chosen such that it produces a vapor pressure sufficient to expand the polymer shell walls at or above the temperature at which the polymer softens.

The concentration of blowing agent in the polymer-solvent solution is chosen according to the desired amount of microsphere expansion. The blowing agent concentration must be high enough that the desired amount of expansion is achieved upon vaporizing the blowing agent. However, the blowing agent concentration must be low enough that the polymer is able to form a coherent shell wall around one or more blowing agent pockets within the microcapsule. The polymer shell wall must also be sufficiently thick so as to prevent excessive diffusion and depletion of the propellant from the microcapsule over the desired shelf-life of the microcapsules. The polymer shell wall must further be sufficiently thick so as to withstand, without rupture, the shell wall thinning which accompanies expansion. It is recognized that the concentration of the blowing agent necessary to provide a given amount of expansion will depend on the volume change upon vaporization of the liquid propellant, as well as the resistance to stretching exhibited by the polymer. It is also recognized that some of the polymer solvent may remain entrapped within the dried microsphere along with the propellant itself, which will act to provide additional expansion in conjunction with the liquid blowing agent. Therefore, exact blowing agent concentrations providing a given amount of expansion must to some extent be empirically determined and optimized for each system in order to achieve the best possible performance. Methods for doing so are known in the art and do not require undue experimentation. For the purposes of this invention and with these constraints in mind, the blowing agent concentration, as given by the ratio of its weight to the weight of polymer added to the solution, is preferably within the range of 1 to 200%. More preferably, the blowing agent to polymer weight ratio shall be between 2 and 100%, and most preferably between 5 and 50%.

Thus, the solution used to produce expandable, optionally fusible microspheres containing liquid blowing agents in accordance with this invention comprises the following components: a polymer or polymer mixture that is to form the microsphere shell walls, a liquid blowing agent or propellant that creates a vapor pressure sufficient to expand the microsphere shell walls upon heating, optional additives to promote crosslinking or other desirable properties, and a solvent that solvates both the polymer and liquid propellant to form a homogeneous, free-flowing solution.

II. With Solid Blowing Agents

Polymeric microspheres having blowing agent cores that are solid at room temperature are produced by first forming a solution consisting of the polymer that is to form the microballoon shell walls and a suitable solvent. The wall-forming polymer may be a thermoplastic, a thermoset, an elastomer, or a mixture of polymers, optionally mixed with cross-linkers (i.e., thermosettable precursors), plasticizers, or other desirable additives. A "suitable solvent" is a solvent capable of dissolving the polymer to form a polymer solution that is homogeneous on a macroscopic scale and is free-flowing. The polymer may be solvated to a concentration between about 0.5 and 90 wt %. More preferably, the polymer is solvated at as high a concentration as possible where solution atomization or break-up into microdroplets is still achievable, such as by atomization or suspension and agitation in a second immiscible liquid. This generally leads to solutions with a polymer content between about 10 and 50 wt %.

In accordance with the present invention, an inert solid blowing agent (or propellant) is also added to the solvated polymer solution. By "inert" it is meant that the blowing agent does not chemically react with either the polymer solvent or the polymer during the normal course of microsphere formation and processing. The blowing agent may be insoluble in the polymer solvent, in which case it should be in the form of a finely divided powder having a sufficiently small particle size. In this case, efficient dispersion of the solid propellant may be aided by first treating the propellant with a surface active agent before mixing with the polymer solution, or by adding surfactants into the total mixture. Ultrasonic agitation can also be used to speed up dispersion. Alternatively, the blowing agent may be soluble in the polymer solvent such that it dissolves in the polymer-solvent solution with no phase separation up to its desired concentration.

The blowing agent is further chosen such that it produces a vapor pressure sufficient to expand the polymer shell walls at or above the temperature at which the polymer softens. The vapor pressure generated upon heating may be caused by the evaporation or sublimation of the propellant (physical blowing agent), or may be generated by a thermally-induced chemical decomposition of the propellant (chemical blowing agent), in which case a sufficient quantity of gas is produced by the decomposition reaction to expand the microcapsule shell walls.

The concentration of blowing agent in the polymer-solvent solution is chosen according to the desired amount of microsphere expansion. The blowing agent concentration must be high enough that the desired amount of expansion is achieved upon vaporizing or decomposing the blowing agent. However, the blowing agent concentration must be low enough that the polymer is able to form a coherent shell wall around one or more blowing agent pockets within the microcapsule. The polymer shell wall must further be sufficiently thick so as to withstand, without rupture, the shell wall thinning which accompanies expansion. It is recognized that the concentration of the blowing agent necessary to provide a given amount of expansion will depend on the volume of gas produced upon vaporization or decomposition of the propellant, as well as the resistance to stretching exhibited by the polymer. It is also recognized that some of the polymer solvent may remain entrapped within the dried microsphere along with the propellant itself, which will act to provide additional expansion in conjunction with the solid blowing agent. Therefore, the exact blowing agent loading level which provides a given amount of expansion must to some extent be empirically determined and optimized for each system in order to achieve the best possible performance. Methods for doing so are known in the art and do not require undue experimentation. For the purposes of this invention and with these constraints in mind, the blowing agent concentration, as given by the ratio of its weight to the weight of polymer added to the solution, is preferably within the range of 1 to 200%.

Thus, the solution or mixture used to produce expandable, optionally fusible microspheres in accordance with this invention comprises, in another embodiment, the following components: a polymer or polymer mixture that is to form the microsphere shell walls, a blowing agent or propellant that generates a vapor pressure sufficient to expand the microsphere shell walls upon heating (said blowing agent or propellant being normally a solid at or near ambient pressure and temperature), optional additives to promote crosslinking or other desirable properties, and a solvent that solvates the polymer (and optionally the solid propellant) to form a free-flowing mixture.

B. Microsphere Formation

In accordance with this invention, expandable, optionally fusible microcapsules are manufactured by atomizing or otherwise breaking up the solution or mixture from section A above into microdroplets by any one of several conventional techniques well known in the art. The purpose of this step is to form small, nominally spherical droplets of the solution. The spherical shape is achieved by means of surface tension effects, which cause a deformable fluid to minimize its surface area. In addition, breaking up the solution into very fine droplets provides an efficient avenue for the removal of the solvent from the droplet composition by evaporation or extraction. As the solvent is removed from the droplets, phase separation occurs whereby the polymer no longer stays in solution within each individual droplet.

Because solvent removal occurs at the droplet surface during drying or extraction processes, the polymer will typically phase separate at the droplet surface first, creating a thin polymer shell surrounding the droplet. Alternatively, the polymer may precipitate within the droplet and migrate to the droplet surface. Further drying occurs as the remaining solvent in the droplet interior diffuses through the polymer shell to the surface and evaporates or is extracted. Diffusion of the solvent through the polymer occurs readily in this case because the solvent is compatible with the polymer, and because the diffusion distance in the microdroplets is short.

Where the blowing agent is a liquid, the agent is essentially trapped within the droplet during drying due to its incompatibility with the polymer, which greatly hinders its permeability through the polymer shell wall.

Where the blowing agent is a solid, the agent does not leave the droplet to any appreciable degree during drying due to its non-volatility. In the case where a polymer solvent-soluble solid propellant is used, the solid propellant will precipitate out of solution as the solvent leaves the droplet. In the case where the solid propellant is insoluble in the polymer solvent, the solid particles will be initially coated with the polymer solution and a polymer coating will be left behind as the solvent is dried or extracted. Thus, drying or extraction of the polymer solvent leads to the formation of a polymer shell wall. When all or most of the solvent has been removed, the final product consists of a polymer shell wall surrounding one or more pockets or particles of the solid blowing agent.

The extent to which additional components remain in the microdroplets during solvent removal will depend on the component's volatility, compatibility with the polymer and blowing agent, and diffusivity in the polymer, among other things. Additives such as crosslinkers, catalysts, plasticizers, pigments, etc., will generally remain within the droplet upon solvent removal since these agents typically have low volatilities.

In a presently preferred embodiment of this invention, the formation of microdroplets is achieved by atomizing the polymer solution into a drying gas atmosphere where solvent removal proceeds by simple evaporative drying. A particular advantage of this embodiment is that the microsphere is automatically cooled as the solvent evaporates due to the latent heat of vaporization associated with such a phase change. Thus, heated gases may be used to facilitate microsphere drying without unduly raising the microsphere temperature and thereby expanding the particles prematurely. Such atomization techniques include, for example, high-pressure atomization, two-fluid atomization, rotary atomization, and ultrasonic atomization. The type of technique used, as well as the operating parameters, will depend on the desired particle size distribution and the composition of the solution being sprayed. Such techniques are well taught in the literature, and ample description can be found in many texts such as, for example, *Spray Drying Handbook* by K. Masters, herein incorporated by reference.

Droplet formation may be alternatively accomplished by introducing the polymer-propellant-solvent solution into a second, immiscible liquid in which the polymer and propellant are immiscible and the polymer solvent is only slightly soluble. With agitation the polymer solution will break up into finely dispersed droplets, forming a suspension of spherical polymer solution droplets distributed within the second liquid. The second liquid shall be chosen such that it is not a solvent for the polymer, and is somewhat incompatible with the polymer solvent such that the overall polymer solution is dispersible as discrete droplets with the second liquid. The second liquid must, however, provide a reasonable solubility for the polymer solvent such that the polymer solvent is extracted from the microdroplets in a manner analogous to evaporative drying. That is, as the microdroplets make contact with and disperse in the second, immiscible liquid, the polymer solvent is extracted from the droplets at their surfaces.

Once sufficient solvent has been removed, the polymer will phase separate and form a polymer shell at the droplet surface, as in the case of evaporative drying. Further extraction of the solvent through the polymer shell wall results in microspheres composed of a polymer shell wall surrounding, in one embodiment, the liquid blowing agent. The liquid propellant will not be substantially extracted into the second liquid due to its incompatibility and low permeability in the polymeric shell walls. In another embodiment, removal of the solvent results in microspheres composed of a polymer shell wall surrounding one or more pockets or particles of the solid blowing agent. The solid propellant will not be substantially extracted into the second liquid due to its extremely low permeability in the polymeric shell walls. The extent to which additional components remain in the droplets during solvent extraction will depend on the component's diffusivity in the polymer and compatibility with the polymer, the blowing agent, and the second liquid medium, among other things. Additives such as crosslinkers, catalysts, plasticizers, pigments, etc., will generally remain within the droplet upon solvent removal since these agents are typically chosen to be compatible with the polymer or polymer solvent. When the microspheres have sufficiently solidified, they may be collected by filtration, centrifugation, sedimentation, flotation, or other separation methods known in the art.

This second liquid may be advantageously selected to be water, as many of the known polymer solvents are immiscible and only slightly soluble in water. Other examples include hydrophobic liquids such as fluorocarbons and silicone fluids. Emulsifying agents may also be added to the second liquid or the polymer solution to promote and stabilize the suspension and particle size distribution of polymer solution droplets. One knowledgeable in the art will be able to select other liquids which meet these criteria, and which will advantageously perform in the manner described above in accordance with this invention.

Another technique that may be used to produce expandable microcapsules in accordance with this invention is to introduce the polymer-propellant-solvent mixture into a second immiscible liquid, similarly to the case mentioned above. Upon agitating the solution, and perhaps with the aid of an emulsifying agent, the polymer solution will disperse into a suspension of microdroplets within the second liquid. The entire solution may then be spray dried by conventional means using an atomization nozzle or other technique well known in the art, whereby the suspension will be dispersed into fine droplets in a gaseous, drying environment. By atomizing the suspension, the polymer solution droplets will make contact with a gaseous interface, and solvent from the polymer mixture can then evaporate from the droplets instead of being extracted into the second liquid as discussed above. The advantage of this approach is that the energy necessary for microdroplet formation (the interfacial energy corresponding to the increase in interfacial area between the two phases) may be added to the system mechanically, independent of the drying step. That is, the surface energy necessary for droplet formation can be provided separately by agitating the two-phase liquid system (the surface energy necessary for droplet formation can also be reduced by the addition of adequate surfactants). Once microdroplet formation has been achieved, the mixture may then be atomized or spray dried in order to evaporate both the polymer solvent and the second immiscible liquid, effectively drying the droplets in a process independent of the droplet formation step.

Atomizing or otherwise forming the polymer solution into microdroplets, followed by solvent drying or extraction, results in a final powdery product which consists of nominally round particles. Such microspheres are composed of a polymeric shell wall surrounding one or more core pockets of a solid or liquid propellant, and preferably contain reactive functionalities, either built into the polymer chains or added to the formulation in the form of crosslinking or other reactive groups, that allow the microspheres to fuse to each other or to a surrounding matrix upon expansion into hollow microballoons. Prior to expansion, however, these microspheres are free-flowing; that is, they do not agglomerate and are detached from each other. Because they do not agglomerate, drying agents are not necessary and the microspheres are free of chemical drying agents, that is, they are residue-free.

C. Microballoon or Microcellular Foam Formation

The microballoons or microcellular foam of the invention are prepared by heating the thermo-expandable microspheres, either by themselves or admixed with a matrix resin or other binder composition. Upon heating, the shell wall material of the microsphere softens and stretches under the expansion force created by the blowing agent, forming a microbubble characterized by one or more gaseous interior voids surrounded by a polymer shell. Having gone through said expansion, the microbubbles are larger than the unexpanded microspheres and have a lower true density. In one embodiment of the present invention, subsequent to or concurrently with microballoon formation (i.e., microsphere expansion), the shell walls of the microballoons join with one another (melt or fuse together) to form a semi-continuous microcellular foam. Upon cooling, the microballoon walls harden to give a microcellular foam. Such a foam can be formed that is at least two to three times the original volume of the unexpanded microspheres.

This foam, consisting of fused microballoons, exhibits voids associated with the microballoon interiors. Additional voids may exist in the extra-cellular regions where the microballoon shells do not merge completely. While the voids associated with the microballoon interiors will be singular and discrete (i.e., generally not connected to each other), the voids attributable to the extracellular regions may be interconnected to the extent that a semi-continuous void structure is formed. Fusing of the walls of the microballoons may occur by simple physical means (in the case of semi-molten surfaces coming into contact), or may occur with the help of crosslinking reactions between the adjacent microballoons. In either case, the foam formation and microballoon fusing process will not be hindered by the presence of chemical drying agents or residues on the microballoon surfaces that result from current manufacturing practices.

Because the unexpanded microspheres are a free-flowing powder, they may be blown, sprayed, dusted, or otherwise spread onto curved or flat surfaces, into cavities or molds, into tubes or pipes, or otherwise into difficult-to-reach places. Once in place, the microspheres may be heated to create a microcellular foam which fills in the voids within a given constrained space to give the foam in a desired geometry.

Alternatively, in another embodiment of the present invention, when the microspheres are expanded within a surrounding matrix, the microsphere shell walls may react with the matrix formulation to create a shell wall that is fused with the surrounding matrix. The result is a microcellular, foamed composite material where the voids within the resin are individual microballoons, which have walls that are integrally bonded with the surrounding matrix. Such bonding with the matrix can eliminate delamination between the microballoons and the matrix resin, providing an overall stronger composite material. It may also help prevent crack initiation within the resin, or may help mitigate crack propagation once a crack tip develops. Alternatively, the matrix resin may be thought of as a binder that bonds to or holds together the expanded microballoons to give a foamed composite material. The resulting composite may or may not contain voids outside the microballoons, depending on the nature of the matrix resin and the mixing conditions used.

D. Material Selection

The polymers that may be used to form the expandable microspheres in accordance with this invention are numerous. In short, any polymer or polymer mixture for which there is a suitable solvent or solvent mixture, and which softens and is stretchable upon the application of heat, may be formed into an expanding, optionally fusible microsphere using the technology provided by this disclosure. Examples of the polymers which may be used include homopolymers such as, but not limited to, polystyrene (α-methyl, brominated), polybutadiene, poly(meth)acrylates, poly (meth)acrylic acids, poly(meth)acrylamides, poly(meth) acrylonitrile, polyethylene (propylene or butylene), polyesters, polyolefins, polyvinylidene fluoride or chloride, polyvinyl alcohol, polyvinyl acetate, polyvinyl ether, or blends or copolymers of these or other homopolymers thereof.

Of particular importance are polymers that are not directly polymerizable by free-radical emulsion or suspension polymerization techniques. These polymers are especially significant with respect to the present invention because they are not viable candidates for use in the expandable microsphere production technologies known prior to this invention. Such polymers enabled by the technology disclosed in the present invention are blocky (diblock, triblock, or multiblock), and sometimes alternating or random copolymers, terpolymers, star-polymers, etc., such as styrene-butadiene (SBR), styrene-acrylonitrile, butadiene-acrylonitrile, styrene-maleic anhydride (SMA), ethylene-(meth)acrylic acid, ethylene glycol-terephthalate (PEG/PET), acrylonitrile-butadiene-styrene (ABS), and other copolymers or blends of polymers and/or copolymers thereof.

Naturally occurring polymers, such as polysaccharides (e.g., celluloses, modified celluloses, starches, chitin, chitosan, etc.), lipids, or proteins or other polypeptides for example, may also be used in accordance with the present invention. This class of polymers is significant in that they are not man-made, but rather are obtained from renewable resources, and are generally not reproducible by synthetic means (emulsion free-radical polymerization or otherwise). Another benefit of naturally occurring polymers is their inherent biocompatibility and biodegradability, properties not often achieved with conventional, free-radical polymerized thermoplastics.

Another very important class of polymers which becomes available for use in the production of expandable microspheres by the present invention is the class of polymers known as engineering thermoplastics. These polymers have a special significance in the present application because of their high dimensional stability, good chemical resistance, good impact strength, high strength at elevated temperatures, and other superlative engineering properties, which may be advantageously incorporated into hollow microspheres or microcellular foams for further property enhancement. Examples of such thermoplastics enabled for use by the present invention include, but are not limited to, polymers such as nylon, polycarbonate, polyamide, polysulfone (polyethersulfone, polyphenylsulfone, polyphenylene ether-sulfone, etc.), polyetherimide, polyketone, polyetherketone, and other engineering thermoplastics thereof. These polymers cannot be used to form expandable microspheres using conventional technology known in the art because they are not amenable to or producible by emulsion or suspension polymerization techniques. Thus, the present invention has an inherent advantage over previously disclosed expandable microsphere technologies because heretofore-unavailable polymers may now be used in an economical and straightforward manner to produce expandable microcapsules.

Polymers which contain one or more reactive functionalities built into the polymer chains will be particularly beneficial in the practice of this invention because such groups can react with a surrounding matrix or can react with suitable crosslinkers to more effectively fuse together the microballoon walls with any adjacent constituents. Such reactive groups could be, for example, alcohols, anhydrides, vinyls, amines, carboxylates, sulfhydryls, aldehydes, epoxies, etc. Specific polymer examples include styrene-maleic anhydride co-polymers (maleic anhydride functionalities), hydrolyzed poly vinyl acetates/poly vinyl alcohol (hydroxyl functionalities), polyethylene imines (primary, secondary, and tertiary amine functionalities), and naturally occurring polymers such as the celluloses and proteins (hydroxyl, carboxyl, amine, sulfhydryl, and other functionalities). The reactive functionalities enable the bonding or reaction of the microballoon shell walls to an appropriately chosen surrounding matrix or to each other. Alternatively, two types of microspheres can be manufactured, one possessing one type of functionality (primary or secondary amines, for example) and another possessing a different type of functionality (anhydrides, for example). The two types of microspheres may then be mixed with each other by simple mechanical means. When this mixture is heated, the microballoons so produced will fuse and react with adjacent microballoons having the opposite functionality, forming a crosslinked microcellular foam.

A particular microsphere composition which may be advantageously exploited by the present invention is one in which the microsphere shell walls are comprised of one or more polymers mixed with one or more reactive components. The reactive components may be of the monomer, crosslinker, reactive oligomer, or oligomeric crosslinker types. Such reactive components may be mono- or multi-functional, having one or more reactive groups per entity. They may be incorporated into the microsphere shell wall material in order to provide crosslinking between the polymer chains, or to form an interpenetrating polymer network (IPN) or semi-interpenetrating polymer network (semi-IPN—produced by the polymerization of the reactive components primarily with themselves) within and across the microballoon walls to adjacent microballoons. The reactive components may also be used to provide reaction with and bonding to the surrounding matrix.

By adding small quantities of thermal or photo-initiators, catalysts or other synergists, the crosslinking reaction or IPN or semi-IPN formation may be designed to proceed during or after the heating and expansion of the microspheres. For example, a thermal initiator may be used which activates crosslinking at a temperature about equal to or higher than the microsphere expansion temperature, such that the microsphere shell walls crosslink only during or after expansion. Photo-initiators may also be incorporated, which make the crosslinking reactions mostly independent of the temperature and allow them to proceed only when the microspheres are exposed to a source of polymerizing energy either before or after expansion has taken place.

The advantages of incorporating reactive components into the polymeric shell wall material are primarily attributable to the formation of a crosslinked polymer shell wall (i.e., thermoset formation). For some applications thermosetting polymers have more desirable properties than thermoplastic-type polymers, including increased dimensional stability, high-temperature performance, chemical resistance, and durability. A lightly crosslinked shell wall, IPN, or semi-IPN can also provide improved solvent resistance prior to microsphere expansion when the crosslinking reactions or IPN formation are triggered independently from, just prior to, or concurrently with the microsphere expansion step.

Examples of reactive components that may be mixed with one or more polymers to make up a microsphere shell wall material are numerous and well-known to those skilled in the art, and only a few will be listed here. However, this invention is not limited to only those listed. For certain crosslinking reactions, di-functional crosslinkers may be employed such as diols, diepoxies, di-isocyanates, di-anhydrides, aldehydes, acrylates, methacrylates, melamines, etc., such as: ethylene glycol, propylene glycol, triethylene glycol, tetraethylene glycol, butanediol diglycidyl ether, bisphenol A diglycidyl ether, partially or completely methylated or butylated melamines, epichlorohydrin, glutaraldehyde, and many others. For IPN or semi-IPN formation, the reactive functional groups may be chosen from acrylate, methacrylate, vinyl ether, vinyl, diene, allyl, epoxy, alcohol, amine, carboxyl, isocyanate, melamine, or others. The reactive components may be used singly or in mixtures. Below are listed acrylate-functional components, but similar structures with other reactive groups could alternatively be used in their place. These include, but are not limited to: ethyl acrylate, propyl acrylate, butyl acrylate, isodecyl acrylate, hexadecyl acrylate, isobornyl acrylate, tetrahydrofurfural acrylate, methyl methacrylate, hydroxy ethyl methacrylate, hydroxy propyl acrylate, polyethylene glycol diacrylate, methylene bisacrylamide, hexanediol diacrylate, polybutadiene diacrylate, bisphenol A diacrylate, trimethylolpropane triacrylate, pentaerythritol tetraacrylate, etc. Other examples include silicates such as trimethoxysilane, dimethoxy-silane, triethoxy-silane, trichlorosilane, etc. These and other suitable reactive compounds are commercially available from companies such as Sartomer, Henkel, Radcure, Gelest, Allied Signal, Aldrich, and others.

Photo-initiators such as the Irgacure and Darocure series are well-known and commercially available from Ciba Geigy, as is the Escacure series from Sartomer. Thermal initiators such as azobisisobutyronitrile (AIBN) benzoyl peroxide, dicumyl peroxide, t-butyl hydroperoxide, and potassium persulfate are also well-known and are available from common chemical suppliers, as are catalysts which may be desirably incorporated to facilitate the crosslinking, IPN, or semi-IPN reactions.

These and other desirable formulations of polymers, polymer mixtures, or polymer compositions with reactive components may not be readily used in the economical manufacture of expandable microcapsules using conventional technology due to the inability or economic impracticality of polymerizing the polymers by emulsion or suspension polymerization techniques and/or including certain desirable reactive groups in such processes. Thus, the present invention provides a much-needed and much-desired method for incorporating such polymers or polymer mixtures into the shell wall materials of expandable microcapsules. Upon microcapsule expansion, the resulting microballoon will greatly benefit from the favorable properties exhibited by such polymer compositions, yielding microballoon shell walls and/or microcellular foams with properties heretofore unattainable through conventional technologies prominently known in the art.

The single requirement with respect to polymer selection in accordance with the current invention is that a suitable solvent or solvent combination must exist for the said polymer or polymer mixture. The solvent must be capable of solvating the polymer to form a nominally homogenous, free-flowing liquid, which in turn must be capable of being atomized or broken up into droplets of the desired size. Solvent selection will depend on the polymer chosen to form the microcapsule shell walls, and may also be influenced by factors such as volatility, flammability, viscosity, toxicity, chemical reactivity, recoverability, cost, and interactions with the blowing agent or other components. Typical solvents which may be used in the practice of this invention include, but are not limited to: acetone, methyl ethyl ketone, ethyl ether, tetrahydrofuran, dimethyl sulfoxide, dimethyl formamide, dimethyl acetamide, methyl acetate, ethyl acetate, propyl acetate, butyl acetate, methanol, ethanol, iso-propanol, toluene, methylene chloride, chloroform, dichloroethane, trichloroethane, tetrachloroethylene, water, and others. The present invention places no requirements on the solvent selected, although it is recognized that certain solvents will be more preferable than others based on the above-stated criteria. It is also recognized that in some situations it may be advantageous or necessary to use a mixture of two or more solvents instead of a single solvent in order to obtain the desired solvation, evaporation, and/or extraction properties.

Depending on the polymer to be used for microsphere formation, the solvent may further be chosen such that it produces a less viscous solution or a solution that is more amenable to microdroplet breakup, either by atomization or agitation in a second immiscible liquid. The viscosity of the solution is not a critical property with respect to the present invention, except insofar as the solution viscosity is low enough for the solution to be atomized or broken up into microdroplets. Preferably, the solvent and polymer concentration shall be chosen so as to provide a dissolved polymer solution with a viscosity less than about 500 centipoise. More preferably, the solution will have a viscosity less than 300 centipoise, and between 0.1 and 100 centipoise most preferably, in order to facilitate atomization or microdroplet formation.

The final component, which must be added to the polymer-solvent mixture, aside from any of the optional additives as mentioned above, is the blowing agent or propellant. When a liquid blowing agent is used, it is typically chosen to be incompatible with the polymer. That is, it does not solvate the polymer to any appreciable degree. This is not an absolute requirement in accordance with the present invention; however, the use of blowing agent-polymer combinations which are incompatible will generally lead to a longer shelf-life for the polymer microspheres since, in this case, the blowing agent will exhibit greatly reduced diffusion through the polymer shell walls. Thus, the choice of expanding agent will vary depending on the nature of the polymer chosen to form the microsphere walls, as well as the solvent chosen to solvate the polymer. When solid propellants are to be used, the interactions with the polymer are much less important since the solid propellants will not typically act to solvate the polymer shell wall.

One important consideration when selecting a liquid blowing agent or propellant is that it must produce a vapor pressure sufficient to expand the polymer walls once the polymer has softened due to heating. Propellant selection in this regard will thus depend on the softening temperature of the polymer chosen to form the microsphere shell walls as well as the vapor pressure of the liquid propellant at this softening temperature. Typically, a solvent that has a boiling point at atmospheric pressure of no more than 10 degrees above the softening temperature (or glass transition temperature, $T_g$) of the polymer will provide a sufficient vapor pressure to expand said polymer shell walls upon heating the microspheres to the boiling point of the blowing agent. More preferably, the boiling point of the propellant liquid at atmospheric pressure will be equal to or less than the polymer $T_g$, and even more preferably, the propellant boiling point will be at least 10 degrees lower than the polymer $T_g$. Particularly preferred liquid blowing agents are the small chain hydrocarbons since they are inert towards most polymers, miscible with most solvents, and have boiling points near ambient temperatures. For liquid blowing agents that have boiling points below ambient temperatures, the process may advantageously be carried out at low temperatures and/or under a pressurized atmosphere.

Examples of liquid propellants that may be used in conjunction with the polymers and solvents listed above include, but are not limited to, hydrocarbons (n-butane, iso-butane, n-pentane, iso-pentane, trimethyl-2-pentene, hexane, heptane, n-octane, iso-octane, nonane, decane, benzene, toluene, etc.), ethers and ketones (ethyl ether, isopropyl ether, acetone, methyl ethyl ketone, etc.), alcohols (methanol, ethanol, iso-propanol, etc.), halogentated hydrocarbons (methylene chloride, chloroform, carbon tetrachloride, dichloroethane, trichloroethane, tetrachloroethane, tetrachloroethylene, trichlorofluoromethane, dichlorodifluorodimethane, etc.), ammonia or ammonia-based liquids, silane or siloxane-based liquids (hexamethyl disilane, hexamethyl disiloxane), and water or other aqueous mixtures. These examples are not meant to be exhaustive, for one skilled in the art will know of many liquids which will exhibit miscibility with a given polymer-solvent mixture while also exhibiting incompatibility with the pure polymer, and at the same time exerting a vapor pressure sufficient to expand said polymer shell walls at or above the softening temperature of the polymer.

The two main types of solid propellants are physical blowing agents and chemical blowing agents. Physical blowing agents are those which produce a vapor by changing phase upon heating. There are a vast number of chemicals that exist as a solid at room temperature, yet vaporize upon reaching temperatures typically used to soften most polymers. Some solid blowing agents of this type pass through an intermediate liquid state upon heating, while others sublime directly to a gas upon heating. Examples of suitable physical blowing agents include, but are not limited to: neopentyl alcohol, hexamethyl ethane, tertiary-butyl carbazate, tertiary-butyl dimethylsilyl chloride, tertiary-butyl N-allylcarbamate, and tetramethyl-1,3-cyclobutanedione, etc. This list is not meant to be exhaustive as one knowledgeable in the field of chemistry will find many substances that meet the criteria described above. In selecting a suitable physical blowing agent, consideration may be given to toxicity, polymer compatibility, solvent compatibility, melting point, boiling point, vapor pressure, or other issues, depending on the particular polymer-solvent system under consideration.

Chemical blowing agents, typically solid at ambient pressure and temperature, undergo decomposition or other chemical reactions that produce gaseous vapors as at least one of the reaction by-products. These reactions are most often triggered by heat, but can alternatively be triggered by the presence of a co-reactant. For instance, a chemical blowing agent could be triggered by the presence of water, whereby water is included in the formulation but only becomes available for reaction upon the addition of heat. (Such would be the case for certain hydrated salt compounds mixed with the chemical blowing agent sodium borohydride.) Chemical propellants can be categorized as either organic or inorganic chemical blowing agents. Inorganic chemical blowing agents typically decompose to give off carbon dioxide gas in an endothermic reaction. Organic chemical blowing agents typically decompose to give off nitrogen gas (which has a lower diffusion rate in most polymers) in an exothermic reaction.

Examples of chemical blowing agents include, but are not limited to: sodium bicarbonate, potassium hydrogencarbonate, sodium borohydride (decomposes upon the addition of a proton donor such as water), polycarbonic acid, ammonium carbonate, ammonium carbamate, ammonium acetate, ammonium diethyldithiocarbamate, dinitrosopentamethylene-tetraamine, p-toluenesulfonyl hydrazide, 4,4'-oxybis(benzenesulfonyl hydrazide), azodicarbonamide, p-toluenesulfonyl semicarbazide, 5-phenyltetrazole, diazoaminobenzene, etc. One advantage of chemical blowing agents is that the carbon dioxide or nitrogen gas typically evolved is inert, nonflammable, and nontoxic. Another advantage is that the inorganic blowing agents can themselves be very inert and nontoxic, which makes them easy and safe to work with during production and in the end-use products.

Solid blowing agents, both physical and chemical (organic and inorganic), avoid the inherent hazards associated with volatile, flammable liquids. Another advantage to be realized by the solid propellants is that the temperature at which microsphere expansion occurs may be altered independent of the polymer used to make the microsphere shell walls. In conventional microspheres, the temperature at which expansion occurs is determined by the softening temperature of the polymer. That is, expansion occurs when the polymer shell walls soften, allowing the vapor pressure of a volatile liquid to stretch the walls outward.

Using the solid propellants described above and in accordance with this invention, however, the polymer-propellant combination may be chosen so that the expansion temperature is dictated by the decomposition temperature of the solid propellant rather than the softening temperature of the polymer. This will occur when the softening temperature of the polymer is below the decomposition temperature of the propellant. As the microcapsules are heated the polymer may soften, but as long as no gas is generated, no expansion will occur. Only upon heating further, to the decomposition temperature of the propellant, will a vapor pressure sufficient to expand the polymer shell walls be generated. Thus, by using solid-phase blowing agents which exert virtually no vapor pressure prior to the onset of decomposition, the temperature at which microsphere expansion occurs may be controlled by the selection of the propellant rather than by the softening temperature of the polymer. This feature can provide added flexibility in designing the temperature ramp-up cycle during the molding processes used to produce final products.

The greatly decreased volatility of the solid propellants used in accordance with this invention further helps to preserve the shelf-life of the expandable microspheres. Since the solid propellants have virtually no vapor pressure and little propensity to permeate through the polymer shell walls, the long-term shelf-life of unexpanded microspheres is expected to be substantially increased. Chemical blowing agents offer an additional advantage over physical blowing agents (liquid or solid) in that they are capable of generating a higher expansion pressure than their physical blowing agent counterparts. This is because physical blowing agents will always be in a state of reversible equilibrium between the liquid and vapor phases. In contrast, the chemical blowing agents decompose to form inert gases in an essentially irreversible process. Because the decomposition is virtually irreversible and the gases produced are difficult to condense, chemical blowing agents are capable of producing much greater pressures than those generated by even the most volatile physical blowing agents.

In order to incorporate the solid propellants into expandable microcapsules, they must be mixed with the polymer-solvent mixture. Whether physical or chemical blowing agents are used, the solid propellant may optionally be dissolved in the polymer-solvent mixture. In the case of soluble systems, the blowing agent is simply dissolved up to its desired composition; the mixture is broken up into microdroplets; and the solvent is dried or extracted from the droplets. When the solid propellant is not soluble in the polymer-solvent mixture, the solid propellant is typically added to the mixture in the form of a finely divided powder. In this case, the size of the propellant particles will be as small as or smaller than the desired microcapsule size. If the solid propellant particles are approximately the same size as the droplets formed by solution break-up, then the final microspheres might contain one or only a few solid propellant particles. If the solid propellant particles are significantly smaller than the droplets formed by solution break-up, then the final microspheres will typically contain many solid propellant particles. The former case ordinarily produces an expanded microsphere with one or only a few voids within the interior of the resulting microballoon. The latter case often produces many voids within the interior of the microballoon.

Solubility of the propellant in the polymer-solvent mixture, the amount of gas generated, the vapor pressure generated, and the temperature at which vapor generation occurs are all parameters that will influence the selection of an appropriate solid propellant for use in accordance with this invention.

The matrix materials with which these microspheres may be incorporated to give a foamed composite material are numerous. Example matrices suitable for microsphere incorporation include paints, inks, epoxies, sealants, insulation, potting compounds, spackling compounds, underbody coatings, papers, fabrics, dielectric laminates, prosthetic devices, synthetic foams, cultured marble, polymer concretes, and synthetic cements. The matrices may be simple one- or two-component mixtures, or may contain any number of additives such as crosslinkers, catalysts, initiators, stabilizers, pigments, fibers, inert fillers, etc.

In one preferable embodiment of this invention, the matrix is an epoxy-based resin mixed with a suitable initiator package. When expandable microspheres made from the copolymer styrene-maleic anhydride (also containing crosslinkers, catalysts, etc.) are incorporated into such a matrix and expanded by heating, crosslinking occurs in the bulk of the epoxy matrix, within the microballoon walls, and across or between the microballoon walls and the epoxy matrix. The final product is a fully crosslinked composite system wherein the microballoons are integrally bonded to the surrounding matrix.

In another preferable embodiment of the present invention, the matrix is a mixture of pulp fibers and, optionally, a sucrose solution. Expandable microspheres made from a prolamine, a protein derived from corn also known as Zein (containing suitable crosslinkers, catalysts, etc.) are mixed into the fiber-sucrose solution, and the mixture is transferred to a mold, filling about half of the total mold cavity volume. When the mold is closed and heated, the mixture expands, fills in the entire mold cavity, and sets with crosslinking within the microballoon walls and between the microballoon walls, the fibers, and the sucrose molecules. The resultant material is a crosslinked, biodegradable, composite foam that is suitable for use as insulation, drink cups, food containers, packaging material, paper or cardboard products, and other traditional foam products.

EXAMPLES

The examples below are meant to show representative polymer, blowing agent, and solvent combinations that are capable of forming expandable, optionally fusible microspheres. These examples further illustrate the formation of expandable, optionally fusible microspheres, as well as the resulting microballoons, microcellular foam or foamed composite material using commercially available polymer resins and only physical processes governed by solution thermodynamics. Other multi-component mixtures can be formulated and processed in accordance with this invention by those skilled in the art of polymer solution thermodynamics.

Example 1

Expandable Microspheres Using Atomization and a Homopolymer

Polymethacrylonitrile (PMN) polymer was obtained from Scientific Polymer Products, Inc., Ontario, N.Y., Catalog #310. Approximately 1.5 grams of PMN was solvated in 15 mL of acetone to form a slightly translucent solution. For the blowing agent, 0.9 mL of iso-pentane was dissolved in the polymer solution. This solution was then atomized with a Preval portable sprayer from Precision Valve Corporation, Yonkers, N.Y., Product # 267, which used its own internal pressure source and a liquid suction feed. The solution was sprayed into a closed box, which was immediately sealed and allowed to sit for several hours. The box was then opened and a fine powder was collected from the bottom of the box. The powder consisted of small, nominally spherical particles ranging in size from about 10 to 80 microns in diameter and which consisted of PMN shells encapsulating a propellant. Upon heating to 120° C., the softening temperature of PMN, the propellant vaporized and expanded a plurality of the microspheres to at least twice their original diameter. The microspheres typically became more spherical after blowing, and upon cooling, they remained in their expanded state.

Example 2

Expandable Microspheres Using Atomization and a Copolymer

Polystyrene-co-maleic anhydride (SMA) polymer was obtained from Aldrich Chemical Company, Inc., Milwaukee, Wis., Catalog #44,238-0. This product has about a 1.3-to-1 styrene-to-maleic anhydride ratio, and a softening temperature of 154 C. Approximately 2.0 grams of SMA was dissolved in 5 mL of ethyl acetate, and an additional 0.2 mL of iso-octane was dissolved to serve as the blowing agent. After mixing, this solution became clear and free-flowing. The solution was atomized using an external-mix touch-up spray gun from DeVilbiss Industrial Spray Equipment, Inc., Maumee, Ohio, model EGA-503-395E. This spray gun used suction feed for the liquid stream, and 20 psi nitrogen was used for the atomization. The polymer-blowing agent-solvent solution was atomized into a closed box, which was immediately sealed and allowed to sit for several hours. The box was then opened and a fine white powder was collected from the bottom of the box. The powder consisted of small, nominally spherical particles ranging in size from about 1 to 40 microns in diameter.

Upon heating several of the microspheres to 160° C., most of the particles turned clear and expanded. The amount of expansion varied, but most of the expanded particles appeared to be at least twice their original diameter or greater. The expanded microballoons could be seen to have thin shell walls surrounding an internal void (in some cases, more than one internal void was seen, separated by an internal polymer membrane). As evidence of their decreased densities, the microballoons could be seen to rise in an oil bath upon void formation and expansion.

Upon heating the microspheres together in a test tube immersed in an oil bath to 160° C., the particles expanded and coalesced to form a foam that occupied several times the original volume of the unexpanded microspheres. The expanded foam could be seen to consist of individual fused microballoons having thin shell walls surrounding an internal void (in some cases, more than one internal void was seen, separated by an internal polymer membrane).

Example 3

Expandable Microspheres Using Atomization and Polycarbonate

Polycarbonate resin was obtained from Bayer Corporation, Pittsburgh, Pa., under the tradename Makrolon. Approximate 2 grams of polycarbonate was solvated in 10 mL of chloroform, and 0.7 mL of 2,4,4 trimethyl-1-pentene was dissolved in the mixture to serve as the liquid blowing agent. Upon mixing, these components formed a clear, homogenous, free-flowing liquid. The solution was sprayed into a closed box using the Preval portable spray gun, forming a fine mist within the box. The box was then closed. After a few hours the box was opened and a fine powder was collected which consisted of polycarbonate microcapsules ranging in size from 1 to 50 microns in diameter.

When several of these microspheres were heated to 120° C., the polycarbonate microcapsules softened and expanded. The resulting microballoons could be seen to consist of a clear shell surrounding one or more internal voids (usually just a single void). Many of the expanded microballoons appeared to approximately triple in diameter from their unexpanded state, corresponding to a 10- to 20-fold volume increase and density decrease.

When the microspheres were heated together to 120° C. in a test tube placed into an oil bath, the polycarbonate microspheres softened and expanded, forming a foamed material which consisted of the individual microballoons fused together.

Example 4

Expandable Microspheres Using Atomization and a Copolymer Mixed with a Reactive Component Polystyrene-co-maleic anhydride (SMA) polymer was obtained from Elf-Atochem North America, Philadelphia, Pa., Product # SMA3000. This product has about a 3-to-1 styrene-to-maleic anhydride ratio, and a softening temperature of about 110° C. Approximately 4.0 grams of SMA was dissolved in 10 mL of ethyl acetate, and an additional 0.2 mL of iso-octane was dissolved to serve as the blowing agent. Also added were 0.4 grams of hexanediol diacrylate (difunctional polymerizable group, HDODA; Radcure) and 0.02 grams of AIBN (Aldrich). After mixing, this solution became clear and free-flowing. The solution was sprayed into a closed box using the Preval portable spray gun, forming a fine mist within the box. The box was then closed. After a few hours the box was opened and a fine powder was collected which consisted of polymeric microcapsules ranging in size from 1 to 50 microns in diameter.

The microspheres were collected and placed into a convection oven at 90° C. (below the softening temperature of the SMA) for four minutes to cure and crosslink the HDODA. After this curing step, substantially fewer of the particles dissolved in an epoxy-based solvent than microspheres created and treated comparably except without the HDODA component. Upon heating to 120° C. on a microscope slide, virtually all of the particles turned clear and expanded to several times their original diameters. The expanded spheres could be seen to have thin shell walls surrounding an internal void (in some cases, more than one internal void was seen, separated by an internal polymer membrane). As evidence of their decreased densities, the particles could be seen to rise in an oil bath upon void formation and expansion.

When mixed into an epoxy-based resin and heated to 120° C. in a test tube, the resin rose in height in the test tube (increased in volume), then cured into a hard, foamed composite. The microballoons within the composite were bonded to the epoxy matrix by means of the maleic anhydride groups in the polymer chains.

Example 5

Expandable Microspheres Using Atomization and a Copolymer Mixed with Crosslinking Components Polystyrene-co-maleic anhydride (SMA) polymer was obtained from Elf-Atochem North America, Philadelphia, Pa., Product # SMA3000. This product has about a 3-to-1 styrene-to-maleic anhydride ratio, and a softening temperature of about 110° C. Approximately 2.0 grams of SMA was dissolved in 5 mL of methyl acetate, and an additional 0.5 mL of iso-octane was dissolved to serve as the blowing agent. Also added were 0.5 grams of a plasticizer (Santicizer S160, Solutia, Inc. St. Louis, Mo.), 0.2 grams of maleic anhydride-grafted polybutadiene resin (Ricon 131MA5; Ricon Resins Inc., Grand Junction, Colo.) as a crosslinker, 0.07 grams of AIBN (initiator, Aldrich), 0.1 gram of tetraethylene glycol (Aldrich) as a crosslinker, and 0.05 grams of a catalyst, 2,4,6-tris(dimethylaminomethyl)phenol (DMP-30, Aldrich). After mixing, this solution became clear and free-flowing. The solution was sprayed into a closed box using the Preval portable spray gun, forming a fine mist within the box. The box was then closed. After a few hours the box was opened and a fine powder was collected, which consisted of polymeric microcapsules ranging in size from 1 to about 50 microns in diameter.

Upon heating several of the unexpanded microspheres to about 120° C., virtually all of the particles turned clear and expanded to several times their original diameters. The expanded microballoons could be seen to have thin shell walls surrounding an internal void (in some cases, more than one internal void was seen, separated by an internal polymer membrane). Upon heating the unexpanded microspheres together to about 120° C. in a test tube, the particles expanded and coalesced to form a crosslinked foam. The foam could be seen to consist of expanded, fused microballoons having thin shell walls surrounding an internal void (in some cases, more than one internal void was seen, separated by an internal polymer membrane). Both the individual microballoons and the foam were also able to withstand higher or more prolonged temperatures without loosing their shape or integrity compared to samples without the crosslinkers, initiator, and catalyst.

When the unexpanded microspheres were mixed into an epoxy-based resin and heated to 120° C. in a test tube, the resin rose in height in the test tube (increased in volume), then cured into a hard, foamed composite. The microballoons within the composite were bonded to the epoxy matrix by means of the maleic anhydride groups in the polymer chains, and the polymer chains were crosslinked to each other by the reaction of the tetraethylene glycol with the maleic anhydride units.

Example 6

Expandable Microspheres Using Liquid-Liquid Extraction and a Homopolymer

Poly-α-methylstyrene (PMS) polymer was obtained from Aldrich Chemical Company, Inc., Milwaukee, Wis., Catalog #19,184-1. Approximately 2 grams of PMS was solvated in 4 mL of tetrahydrofuran along with 0.9 mL of 2-methyl butane as the blowing agent. The mixture formed a clear, homogeneous solution. Separately, 100 mL of an aqueous solution with 2 wt % PVA (Mowiol surfactant, 88% hydrolyzed PVA, Aldrich Chemical Company, Catalog # 32,459-0) was made, then placed into a 100 mL graduated cylinder, which was capped with a rubber septum and turned upside down. Agitation was provided by a magnetic stir bar within the cylinder, and a magnetic stirrer sitting just outside the cylinder. While the solution in the cylinder was stirred, the polymer solution was slowly injected into the cylinder (approximately 0.1 mL per second) through the septum using a 10 mL syringe with a 29 gauge, 1.5" needle.

Upon injecting the polymer solution into the aqueous solution through the syringe tip, very small droplets were formed which rose towards the surface of the water. As the polymer solution droplets rose in the aqueous phase, the THF solvent was extracted from the droplets into the water. The droplets turned translucent and then opaque as they rose, indicative of the THF extraction. Once all of the polymer solution was injected into the graduated cylinder, the cylinder contents were filtered and washed several times with fresh water (no surfactant). The filtrate was then allowed to dry in room air, after which a fine white powder could be collected from the filter paper. The powder consisted of PMS microcapsules ranging in size from 25 to 100 microns.

When several of the microspheres were heated to 120° C., the spheres expaned to 2 to 3 times their original diameter, forming microballoons in which a polymeric shell wall surrounded one or more internal voids. When heated together to 120° C. in a test tube in an oil bath, the microcapsules expanded and merged together to form a foamed material consisting of fused microballoons.

Example 7

Expandable Microspheres Using Atomization and a Naturally Occurring Polymer Mixed with a Crosslinking Component A natural protein extracted from corn gluten, known as prolamine or zein (Zein), was obtained from Freeman Industries, LLC, Tuckahoe, N.Y., Product # F4000. This product has a softening temperature of about 105° C. Approximately 1 gram of Zein was dissolved in 1 gram of isopropyl alcohol, 1 gram of ethyl alcohol, and 0.9 grams of water. About 0.2 grams of glutaric dialdehyde (50% in water, Aldrich product # 34,085-5) and 0.15 grams of ethylene glycol were added to crosslink and plasticize the polymer, respectively. An additional 0.2 grams of 1,1,1-trichloroethane were added to serve as the blowing agent. After mixing, this solution became free-flowing. The solution was sprayed into a closed box using the Preval portable spray gun, forming a fine mist within the box. The box was then closed. After a few hours the box was opened and a fine yellow powder was collected, which mostly consisted of polymeric microspheres ranging in size from 5 to 100 microns in diameter.

Upon heating several of the unexpanded microspheres to approximately 120° C., virtually all of the particles turned clear and expanded from three to five times their original diameters. The expanded microballoons could be seen to have thin shell walls surrounding an internal void (in some cases, more than one internal void was seen, separated by an internal polymer membrane). As evidence of their decreased densities, the microballoons could be seen to rise in an oil bath upon void formation and expansion.

Upon filling a cylindrical-shaped mold about half full with the unexpanded microspheres, sealing the mold shut, and heating to approximately 120° C., the particles expanded and coalesced, filling the mold cavity. After removal from the mold, the resultant article was a biodegradable foam having the shape of the internal mold cavity, comprised of fused microballoons which could be seen to have thin shell walls surrounding an internal void (in some cases, more than one internal void was seen, separated by an internal polymer membrane).

When mixed into an epoxy-based resin and heated to 120° C. in a test tube, the resin rose in height in the test tube (increased in volume), then cured into a hard, foamed composite. The microballoons within the composite were bonded to the epoxy matrix by means of the alcohol groups in the polymer chains (to a lesser extent by the other protein residues), and the polymer chains were crosslinked to each other by the reaction of the glutaric dialdehyde. Reaction of the sulfhydryl groups in the polymer chain to form disulfide bonds is also expected to contribute to crosslinking.

Example 8

Expandable Microspheres Using Atomization and a Naturally Occurring Polymer Mixed with a Crosslinking Component Approximately 3 grams of Zein was dissolved in 7 grams of methyl alcohol and 5 grams of acetone. About 0.25 grams of a butylated melamine-formaldehyde resin (Cymel 1156, Cytec Industries, West Paterson, N.J.), 0.125 grams of an acid catalyst (Cycat 600, Cytec Industries, West Paterson, N.J.), and 0.6 grams of zinc chloride (Aldrich) were added to facilitate crosslinking of the microballoons. An additional 0.6 grams of iso-pentane were added to serve as the blowing agent. After mixing, this solution became free-flowing. The solution was sprayed into a closed box using the Preval portable spray gun, forming a fine mist within the box. The box was then closed. After a few hours the box was opened and a fine yellow powder was collected, which mostly consisted of polymeric microcapsules ranging in size from 5 to 100 microns in diameter.

Upon filling a cylindrical-shaped mold about half full with the microspheres so produced, sealing the mold shut, and heating to approximately 120° C., the particles expanded and coalesced, filling the mold cavity. After removal from the mold, the resultant article was a biodegradable foam having the shape of the internal mold cavity, comprised of fused microballoons which could be seen to have thin shell walls surrounding an internal void (in some cases, more than one internal void was seen, separated by an internal polymer membrane).

When mixed into an epoxy-based resin and heated to 120° C. in a test tube, the resin rose in height in the test tube (increased in volume), then cured into a hard, foamed composite. The microballoons within the composite were bonded to the epoxy matrix by means of the alcohol groups in the polymer chains (to a lesser extent by the other protein residues), and the polymer chains were crosslinked to each other by the reaction of the melamine resin. Reaction of the sulfhydryl groups in the polymer chain to form disulfide bonds is also expected to contribute to crosslinking.

Example 9

Expandable Microspheres Using Atomization and Polycarbonate

Polycarbonate resin was obtained from Bayer Corporation, Pittsburgh, Pa., under the tradename Makrolon. Approximate 2 grams of polycarbonate was solvated in 10 mL of chloroform, along with 2.0 grams of a solid blowing agent, 4,4'-oxydibenzenesulfonyl hydrazide (ODBSH, from Aldrich Chemical Company, Inc., Milwaukee, Wis., Catalog #25,046-5) and 1.0 gram of triethanolamine (to lower the ODBSH decomposition temperature). Upon mixing, these components formed a clear, homogenous, free-flowing mixture. This solution was then atomized with a Preval portable sprayer from Precision Valve Corporation, Yonkers, N.Y., Product # 267, which used its own internal pressure source and a liquid suction feed. The solution was sprayed into a box, which was immediately closed. After a few hours the box was opened and a fine powder was collected which consisted of polycarbonate microspheres ranging in size from 1 to 70 microns in diameter, most being near 40 microns in diameter. When these microspheres were heated to 120° C., the polycarbonate microcapsules softened, the solid blowing agent decomposed, and the microspheres expanded. The spheres could be seen to consist of a clear shell surrounding one or more internal voids. Many of the expanded spheres appeared to approximately double in diameter from their unexpanded state, corresponding to an approximately 10-fold volume increase and density decrease.

Example 10

Expandable Microspheres Using Atomization and a Polyetherimide

A polyetherimide resin was obtained from GE Plastics, Pittsfield, Mass., under the tradename Ultem1000. Approximately 2.0 grams of the Ultem1000 was dissolved in 10 mL of chloroform along with 1 gram of t-butyl carbazate (TBC, from Aldrich Chemical Company, Inc., Milwaukee, Wis., Catalog #B9,100-5). These components formed a uniform, clear, free-flowing mixture which was subsequently atomized with the Preval sprayer into a closed box. The box was sealed and allowed to sit for several hours, after which a fine powder was collected from the bottom of the box. The powder consisted of Ultem1000 microspheres ranging in size from about 5 to 50 microns. When the microspheres were heated to 150° C., a plurality of the capsules expanded to 2–3 times their original diameters, corresponding to a 10- to 20-fold increase in particle volume. It was clearly observed that the microballoons consisted of a thin, clear polymeric shell wall, usually surrounding a single internal void.

Example 11

Expandable Microspheres Using Liquid-Liquid Extraction and a Homopolymer

Polymethacrylonitrile (PMN) polymer was obtained from Scientific Polymer Products, Inc., Ontario, N.Y., Catalog #310. Approximately 1.0 gram of PMN was solvated in 5 mL of nitromethane to form a slightly translucent solution. For the solid blowing agent, 1.0 gram of ptoluenesulfonyl hydrazide (TSH, from Aldrich Chemical Company, Inc., Milwaukee, Wis., Catalog #13,2004) was dissolved in the polymer solution. These components formed a translucent, macroscopically homogeneous solution. Separately, 300 mL of an aqueous solution with 2 wt % PVA (Mowiol surfactant, 88% hydrolyzed PVA, Aldrich Chemical Company, Catalog # 32,459-0) was made, then placed into a 400 mL acrylic cylinder, which was capped with a rubber septum and turned upside down. Agitation was provided by a magnetic stir bar within the cylinder, and a magnetic stirrer sitting just outside the cylinder. While the solution in the cylinder was stirred, the polymer solution was slowly injected into the cylinder (approximately 0.1 mL per second) through the septum using a 3 mL syringe with a 25 gauge, 1.5" needle.

Upon injecting the polymer solution into the aqueous solution through the syringe tip, very small droplets were formed, which were agitated within the aqueous solution by the magnetic stir bar. As the polymer solution droplets contacted the aqueous phase, the nitromethane solvent was slowly extracted from the droplets into the water. The droplets turned translucent and then opaque within minutes, indicative of the nitromethane extraction and PMN precipitation from solution. Once all of the polymer solution was injected into the graduated cylinder and sufficient agitation was provided to turn all of the droplets opaque, the cylinder contents were filtered and washed several times with water. The filtrate was then allowed to dry in room air, after which a fine white powder could be collected from the filter paper. The powder consisted of PMN microcapsules ranging in size from 25 to 100 microns. When heated to 120° C., the microcapsules expanded up to 2 to 3 times their original diameter, forming microballoons in which a polymeric shell wall surrounded one or more internal voids.

What is claimed is:

1. A method of forming a microcellular foam, comprising the steps of:

solvating a polymer, co-polymer, or polymer blend with an appropriate solvent;

combining the solvated polymer, co-polymer or polymer blend with a blowing agent to give a mixture;

forming microscopic droplets from the mixture;

removing the solvent from the microscopic droplets to precipitate out the polymer and blowing agent; and isolating the precipitated polymer and blowing agent product to give thermo-expandable but unexpanded microspheres comprising a polymeric wall surrounding one or more pockets of blowing agent within the microsphere and wherein the polymeric wall comprises reactive functionalities that allow fusion to other microspheres upon expansion of the microspheres; and heating the thermo-expandable microspheres at a temperature that causes the microspheres to expand, to give expanded microbubbles, at least a portion of the microbubbles being fused to each other to give a microcellular foam.

2. A method according to claim 1 wherein the polymeric wall comprises a polymer, co-polymer, or polymer blend selected from the group consisting of anhydride-containing polymers and copolymers, hydroxyl-containing polymers and copolymers, amine-containing polymers and copolymers, naturally occurring polymers, and a mixture of a polymer and one or more reactive oligomers or crosslinkable moieties capable of forming a crosslinked, interpenetrating, or semi-interpenetrating polymeric network within the polymeric wall.

3. A method according to claim 1 wherein the polymeric wall comprises a polymer, co-polymer, or polymer blend selected from the group consisting of polystyrene-co-maleic anhydride, polyhydroxyethyl methacrylate, and poly(4-vinyl pyrridine).

4. A method according to claim 2 wherein the naturally occurring polymer is selected from the group consisting of polysaccharides, lipids, and proteins.

5. A method according to ckaim 2 wherein the naturally occurring polymer is zein.

6. A method according to claim 1 wherein the polymeric wall comprises a polymer, co-polymer, or polymer blend that is not directly polymerizable by free-radical emulsion or suspension polymerization technique.

7. A method according to claim 1 wherein the polymeric wall further comprises reactive functionalities that crosslink within the wall upon expansion of the microsphere.

8. A method according to claim 1 wherein the blowing agent is a liquid.

9. A method according to claim 1 wherein the blowing agent is a solid at room temperature.

10. A method according to claim 1 wherein the microspheres are free-flowing.

11. A method according to claim 1 wherein the microcellular foam is biodegradable.

12. A method of forming a foamed composite material, comprising the steps of:

solvating a polymer, co-polymer, or polymer blend with an appropriate solvent;

combining the solvated polymer, co-polymer or polymer blend with a blowing agent to give a mixture;

forming microscopic droplets from the mixture;

removing the solvent from the microscopic droplets to precipitate out the polymer and blowing agent; and isolating the precipitated polymer and blowing agent product to give thermo-expandable but unexpanded microspheres comprising a polymeric wall surrounding one or more pockets of blowing agent within the microsphere and wherein the polymeric wall comprises reactive functionalities that allow fusion to a matrix upon expansion of the microspheres; and heating the thermo-expandable microspheres at a temperature that causes the microspheres to expand, to give expanded microbubbles, at least a portion of the microbubbles being fused to the matrix to give a foamed composite article.

13. A method according to claim 12 wherein the polymer, co-polymer or polymer blend is selected from the group consisting of polymer blends, non-random copolymers, block copolymers, branched, comb-shaped, or star-shaped polymers, engineering thermoplastics, naturally occurring polymers, polymers produced by step-growth-type polymerization mechanisms, and a mixture of a polymer and one or more reactive oligomers or crosslinkable moieties capable of forming a crosslinked, interpenetrating, or semi-interpenetrating polymeric network within the polymeric wall.

14. A method according to claim 12 wherein the foamed composite material is biodegradable.

* * * * *